No. 659,790. Patented Oct. 16, 1900.
W. J. CRUYT.
ROTARY MOTOR.
(Application filed Apr. 24, 1899.)

(No Model.)

Witnesses.
Albert Jones
Frederick Burnham

Inventor.
William John Cruyt
By his Attorneys.
Wheatley & MacKenzie

UNITED STATES PATENT OFFICE.

WILLIAM JOHN CRUYT, OF BRUSSELS, BELGIUM.

ROTARY MOTOR.

SPECIFICATION forming part of Letters Patent No. 659,790, dated October 16, 1900.

Application filed April 24, 1899. Serial No. 714,284. (No model.)

*To all whom it may concern:*

Be it known that I, WILLIAM JOHN CRUYT, engineer, a subject of the King of Belgium, residing at 80 Chaussée de Fleurgat, Brussels, in the Kingdom of Belgium, have invented a new and Improved Rotary Motor, (for which applications have been filed in Belgium on March 18, 1899, and in Germany on March 23, 1899,) of which the following is a full, clear, and exact description.

The object of this invention is to provide a novel arrangement of the impulsion-valves in rotary motors of the kind in which the circular valve-casing has a concentric rotary motion around a fixed steam-distributing body formed in the interior as an eccentric, the valves under this arrangement being perfectly packed and so seated that the rattling noise produced by the valves in returning from the working position is entirely prevented.

The new valve arrangement is illustrated by way of example in the accompanying drawings, in which, for the purpose of making the said arrangement perfectly intelligible in general—

Figure 1:
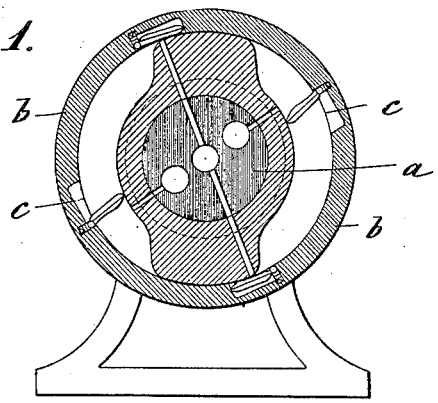
Figure 2:
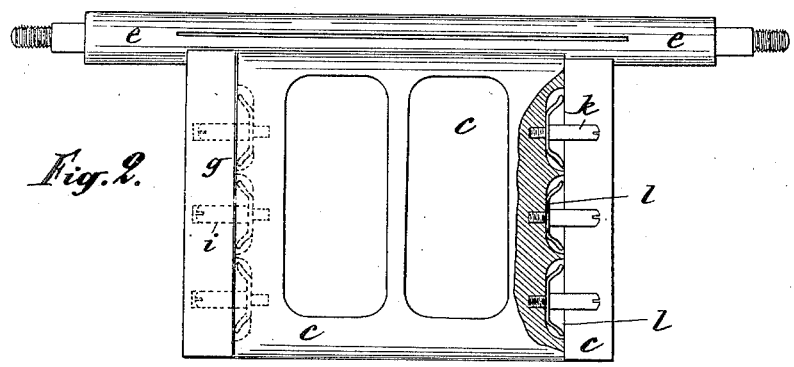
Figure 3:
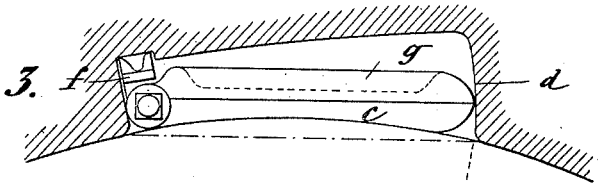
Figure 4:
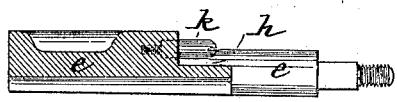
Figure 5:
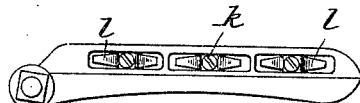
Figure 6:
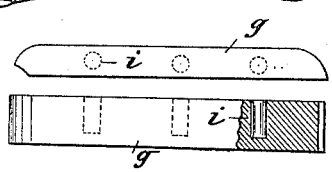

Figure 1 is a sectional elevation of the entire motor. Fig. 2 is a sectional plan of the valve on an enlarged scale. Fig. 3 is a side view showing the arrangement of the valve in the chamber; Fig. 4, a cross-section of the half of a valve with the packing removed; Fig. 5, a side view of the same with the packing removed; and Fig. 6, a side view and plan, partly in section, of the packing-piece.

In Fig. 1 $a$ is the steam-distributing body firmly seated in its frame, $b$ the valve-casing, which rotates, and $c$ the valves oscillating in the valve-casing. In the present example the interior of the steam-distributing body is formed as a symmetrical double eccentric and furnished as regards each with two inlet and two outlet channels, whereby the valve-casing can be provided with four valves, so that two valves are always acting together. In the circular wall of the valve-casing the valve-chambers are formed in such a manner that when the valves go back completely into the casings a free space is left behind them, which is closed on all sides, while at the same time the lower valve-surface, formed as a corresponding arc of a circle, exactly replaces the open or cut-away part of the inner circular wall of the valve-casing. This exact adjustment in the arc of the circle or continuation of the same is effected by the free front end of the valve being rounded off and the valve lying with this rounded-off part against the corresponding front wall $d$ of the valve-chamber, which has a slight inclination inward, Figs. 1 and 3. Owing to this arrangement the valve $c$, raised by the eccentric, strikes noiselessly against the wall $d$, this noiseless action being promoted by the cushioning action of the compressed steam in the free space behind the valve, so that the valve does not strike out suddenly. Any retention or jamming of the valve in this position is prevented in consequence of the valve-shaft $e$, which is packed on the outside with sliding stuffing-boxes in the side walls of the valve-casing, being when the valve is forced into its casing forced against a bar $f$, seated in the circular wall and under spring-pressure, Fig. 3, and has thus a constant tendency to bring the valve back into the working position—that is to say, to press it down onto the distributing-body on which the valve, perfectly packed, slides with the front rounded-off portion.

The packing of the valves at the sides is effected by spring sliding pieces $g$, the finely-ground surfaces of which form exclusively the part coming into contact with the side walls of the valve-casing, which are likewise ground or polished. The sliding pieces $g$, which have on their front ends the contour of the valve proper, $c$, Figs. 3 and 5, are fitted into corresponding gaps $h$ in the valve proper and are guided by means of perforations, Figs. 2 and 6, on pins $k$, Figs. 2 and 4, which project from the shoulder piece or wall of the gap $h$ and at the same time serve for screwing the bow-shaped spring-plates $l$ firmly to the valve-body, Figs. 2 and 5, these plates pressing with their ends against the inner sides of the sliding pieces, and thus holding the same with their outer sides tightly against the side walls of the valve-casing, whereby the greatest disadvantage of valve-motors— viz., imperfect packing and the loss of power resulting therefrom—are entirely obviated.

It is obvious that the arrangement described is only given by way of example, as it can be replaced by any other suitable division of the valves and any other sideward dispersion or separation thereof.

What I claim, and desire to secure by Letters Patent, is—

In rotary motors the combination with a fixed steam-distributing body, and a casing capable of rotating around the said body, of inwardly-widening valve-chambers formed in the casing, of reciprocating valves or pistons with rounded-off outer edges, working in the chamber and adapted to be forced back with their faces flush with the interior of the casing, of the valve-shaft, the spring-pressed bars operating on the shafts to press the valves against the distributing-body, sliding packing-pieces mounted in the valves, and springs forcing the packing-pieces against the side walls of the valve-chamber.

In witness whereof I have hereunto set my hand in presence of two witnesses.

WILLIAM JOHN CRUYT.

Witnesses:
AUG. JOERISSEN,
GREGORY PHELAN.